(12) United States Patent
Cyuzawa et al.

(10) Patent No.: US 8,929,046 B2
(45) Date of Patent: Jan. 6, 2015

(54) DC BRANCH CIRCUIT PROTECTING DEVICE

(75) Inventors: Takaaki Cyuzawa, Hirakata (JP); Hiroaki Koshin, Toyonaka (JP)

(73) Assignee: Panasonic Corporation, Kadoma-Shi (JP)

( * ) Notice: Subject to any disclaimer, the term of this patent is extended or adjusted under 35 U.S.C. 154(b) by 123 days.

(21) Appl. No.: 13/380,183

(22) PCT Filed: Jun. 18, 2010

(86) PCT No.: PCT/JP2010/060362
§ 371 (c)(1),
(2), (4) Date: Dec. 22, 2011

(87) PCT Pub. No.: WO2010/150706
PCT Pub. Date: Dec. 29, 2010

(65) Prior Publication Data
US 2012/0099236 A1    Apr. 26, 2012

(30) Foreign Application Priority Data
Jun. 23, 2009 (JP) ................................. 2009-148962

(51) Int. Cl.
| H02H 3/00 | (2006.01) |
| H02H 7/00 | (2006.01) |
| H02J 1/06 | (2006.01) |
| H02H 3/087 | (2006.01) |
| H02H 3/08 | (2006.01) |
| H02H 9/02 | (2006.01) |
| H01H 71/12 | (2006.01) |
| H02H 7/26 | (2006.01) |
| H02H 3/10 | (2006.01) |

(52) U.S. Cl.
CPC H02J 1/06 (2013.01); H02H 3/087 (2013.01); H01H 71/123 (2013.01); H02H 7/26 (2013.01); H02H 3/10 (2013.01)
USPC ......... 361/101; 361/93.1; 361/93.5; 361/93.7

(58) Field of Classification Search
USPC ........................................ 361/93.5, 93.7, 101
See application file for complete search history.

(56) References Cited

U.S. PATENT DOCUMENTS

| 5,132,865 A | 7/1992 | Mertz et al. |
| 5,463,252 A | 10/1995 | Jones et al. |

(Continued)

FOREIGN PATENT DOCUMENTS

| JP | 62-076117 A | 4/1987 |
| JP | 03-105813 A | 5/1991 |

(Continued)

OTHER PUBLICATIONS

JP 2005-190671, Fig. 1, Specification, abstract.*

(Continued)

Primary Examiner — Dharti Patel
(74) Attorney, Agent, or Firm — Edwards Wildman Palmer LLP

(57) ABSTRACT

A DC distribution board comprises, therein as internal devices, a circuit breaker 5 provided along each of branch lines branched from main wires of a direct-current power supply, and a controller 6 for controlling switching of the breaker 5. The circuit breaker 5 comprises: power connecting terminals t1, t2 connected to the main wires; load connecting terminals t3, t4 connected with wires from a load; a semiconductor switch device 57 provided along an electrical circuit between the terminals t1, t2 and the terminals t3, t4; a current sensing resistor 56 for detecting an electric current through the electrical circuit; and a arithmetic circuit 60 for turning the device 57 on or off according to an on/off control signal from the controller 6, and coercively turning the device 57 off when a current value obtained from a voltage across the resistor 56 exceeds a set current.

5 Claims, 5 Drawing Sheets

(56) References Cited

U.S. PATENT DOCUMENTS

| | | |
|---|---|---|
| 2002/0080544 A1 | 6/2002 | Pellegrino |
| 2003/0142449 A1 | 7/2003 | Iwata et al. |
| 2003/0183838 A1 | 10/2003 | Huang et al. |
| 2006/0238363 A1* | 10/2006 | Johnson ............ 340/638 |
| 2010/0027180 A1* | 2/2010 | Bingel et al. ......... 361/93.9 |

FOREIGN PATENT DOCUMENTS

| | | | |
|---|---|---|---|
| JP | 10-302585 A | 11/1998 | |
| JP | 2000-215780 A | 8/2000 | |
| JP | 2000-236621 A | 8/2000 | |
| JP | 2002-252923 A | 9/2002 | |
| JP | 2004-187424 A | 7/2004 | |
| JP | 2004-282802 A | 10/2004 | |
| JP | 2005-295791 A | 10/2005 | |
| JP | 2007-252081 A | 9/2007 | |
| JP | 2008-043001 A | 2/2008 | |
| JP | 2008-259254 A | 10/2008 | |
| JP | 2010-040207 A | 2/2010 | |
| WO | WO-2005040992 A2 | 5/2005 | |
| WO | WO-2009/081912 A1 | 7/2009 | |
| WO | WO-2010/013783 A1 | 2/2010 | |

OTHER PUBLICATIONS

Koshin Hiroaki; DC switch; Publication Date: 18.02.2010; Abstract, Drawings, Specification.*

International Search Report dated Jul. 27, 2010, issued for PCT/JP2010/060362.

Extended European Search Report dated Mar. 21, 2014, 2010, issued for EP 10792024.1, 8 pages, European Patent Office, Munich, Germany.

* cited by examiner

PRIOR ART

DC BRANCH CIRCUIT PROTECTING DEVICE

TECHNICAL FIELD

The invention relates to a DC branch circuit protecting device.

BACKGROUND ART

As shown in FIG. 5A, there is a power supply device 100, as a conventional power supply device equipped with a protective function for protecting a load from an overcurrent, provided with a fuse F along an output end of a constant-voltage source E with which loads L1-L4 are connected in parallel through switches S1-S4, respectively.

In this power supply device 100, there is an issue that power feeding to all the loads L1-L4 is shut off when the fuse F is melted by an overcurrent, because the loads L1-L4 are protected from an overcurrent with the fuse F connected along the output end of the constant-voltage source E.

Therefore, in order to protect each load of branch circuits from an overcurrent, a conventional power supply device 101 is provided with a multipoint connector 102 connected with a plurality of load circuits as shown in FIG. 5B (e.g., Patent Documents 1-4). In this power supply device 101, a direct-current power from a constant-voltage source E is supplied to loads L1-L3 connected to the multipoint connector 102 via built-in circuit protectors CP1-CP3. When an overcurrent flows by occurrence of short-circuit or the like at any of the loads L1-L3, the power supply device 101 shuts off, through a break operation by a corresponding one of the circuit protectors CP1-CP3, only power feeding to the branch circuit through which the overcurrent flows. Accordingly, power feeding to the remaining load circuits can be continued.

PRIOR ART DOCUMENTS

Patent Document 1: Patent Application Publication No. 2002-252923
Patent Document 2: Patent Application Publication No. 2005-295791
Patent Document 3: Patent Application Publication No. 2007-252081
Patent Document 4: Patent Application Publication No. 2008-259254

SUMMARY OF INVENTION

Technical Problem

In the aforementioned power supply device 101, there is a problem of low expandability or elasticity because the predetermined number of circuit protectors CP1-CP3 are previously built in, and therefore the number of the branch circuits is fixed and the number of circuits can not be easily changed.

Solution to Problem

The present invention is provided in view of the aforementioned problems, and an object is to provide a DC branch circuit protecting device, which has high expandability or elasticity and is capable of easily increasing and decreasing the number of circuits.

In order to achieve the above object, a DC branch circuit protecting device of the present invention comprises a circuit breaker which is, as an internal device, put in a distribution board for distributing direct-current power supply to branch lines and is provided along each of branch lines branched from main wires of the direct-current power supply. The circuit breaker comprises power connecting terminals connected to the main wires in the distribution board, load connecting terminals connected with wires from a load, and a semiconductor switch device provided along an electrical circuit between the power connecting terminals and the load connecting terminals. The circuit breaker also comprises a current sensing means for detecting an electric current through the electrical circuit, and a current setting means to which a set current according to a load connected to the load connecting terminals is set. The circuit breaker further comprises a switch controlling means for coercively turning the semiconductor switch device off when a detection value of the current sensing means exceeds the set current which is set to the current setting means, and an on/off switch that is provided along the electrical circuit and is turned on or off in accordance with a switching operation through a manual operation portion.

In the DC branch circuit protecting device, it is preferred that: the power connecting terminals comprise plug-in terminals which conductive bars forming the main wires in the distribution board are inserted into and connected with; and the load connecting terminals comprise terminals having quick connection construction, which cores of the wires of which jackets are removed are inserted into and connected with.

In the DC branch circuit protecting device, it is preferred that a controller for controlling a switching of the circuit breaker is, as an internal device, put in the distribution board along with the circuit breaker, and the switch controlling means is configured to turn the semiconductor switch device on or off in accordance with an on/off control signal from the controller.

In the DC branch circuit protecting device, it is preferred that the circuit breaker comprises a plurality of circuit breakers, and the controller is provided with a storing means and a control signal outputting means. A sequence for turning the circuit breakers on or off in turn is stored in the storing means. The control signal outputting means supplies each of the circuit breakers with an on/off control signal so that the circuit breakers are turned on or off in turn in accordance with the sequence stored in the storing means.

In the DC branch circuit protecting device, it is preferred that said circuit breaker is provided with a supervisory signal outputting means configured to supply the controller with a detection value of the current sensing means as a supervisory signal.

Advantageous Effects of Invention

According to the present invention, since the circuit breaker is, as an internal device, put in the distribution board, the necessary number of circuit breakers are provided and thereby the number of branch circuits can be easily increased or decreased. Moreover, in the circuits breaker, since a semiconductor switch device is coercively turned off when the an electric current exceeding a set current according to a load flows, loads can be protected per branch circuit. In addition, a maintenance work can be performed safely by handling the manual operation portion to coercively turn the on/off switch off when the maintenance work is performed at the branch circuit side or the like, because the on/off switch is opened or closed in accordance with a switching operation through the manual operation portion,

DESCRIPTION OF EMBODIMENTS

Embodiments of the present invention are now explained with reference with the figures.

In recent years, diminishing emission of greenhouse gases is required as a global warming countermeasure. Also in civilian sectors, reducing power consumption is promoted in order to reduce carbon-dioxide emissions of energetic origins.

In ordinary houses, various home electric appliances are used, and many home electric appliances are driven by an alternating-current power supply at present. Accordingly, home electric appliances in each ordinary house are operated by supplying each house with an alternating-current power from an electric power company. On the other hand, there are increasing devices in home electric appliances, which are, for example, air conditioners, refrigerators, washing machines and the like, and each employ inverter control systems. In inverter control type of electric appliances, alternating-current power from an indoor outlet is converted into direct-current power through a built-in AC/DC converter, and then inverted into alternating-current through an inverter circuit, thereby activating a load. Thus, since two conversions from alternating-current to direct-current and from direct-current to alternating-current are performed, power loss is increased by the power conversions.

Therefore, the present applicant suggests providing housing with an AC/DC hybrid wiring system provided with a direct-current wiring system for supplying direct-current power supply in addition to a conventional alternate-current wiring system for supplying commercial alternating-current power supply.

Figure 4:
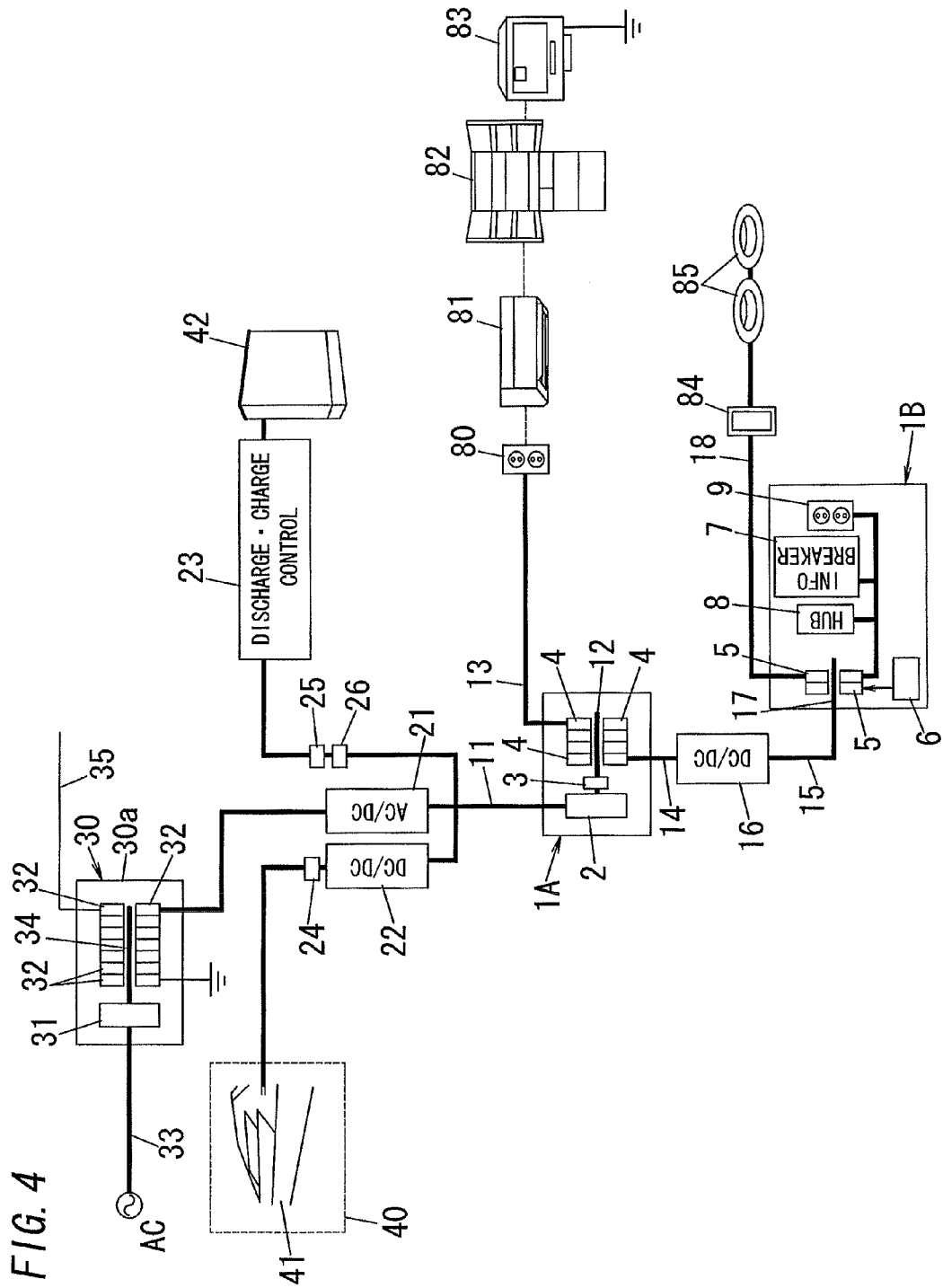
FIG. 4 is a system configuration diagram of an AC/DC hybrid wiring system with ditto.
Figure 5A:
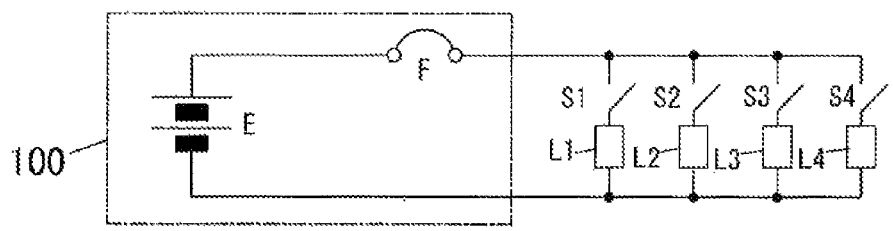
FIGS. 5A and 5B are circuit diagrams of prior art power supply devices.
Figure 5B:
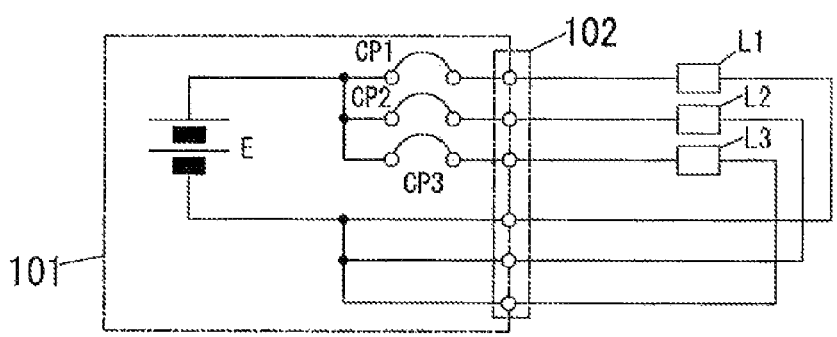

FIG. 4 shows a system configuration of an AC/DC hybrid wiring system. The system shown in the figure is provided with two direct-current wiring systems in addition to an alternate-current wiring system. Direct-current wiring system type of DC distribution boards 1A, 1B and an alternate-current wiring system type of alternating-current distribution board 30 are installed in housing. The two direct-current wiring systems comprises a low-voltage DC wiring system and a high-voltage DC wiring system. In the low-voltage DC wiring system, a safety extra-low voltage (SELV) such as, for example, DC12V, DC24, DC 48V is supplied. In the high-voltage DC wiring system, a direct-current voltage higher than the SELV power supply (e.g., DC+/−150V, and DC300V across both ends) is supplied to a direct-current load(s).

In the high-voltage DC wiring system type of DC distribution board 1A, internal devices such as a main breaker 2, an earth leakage circuit breaker 3 and branch circuit breakers 4 are put in a main body. The main breaker 2 is connected with three direct-current power lines 11 (DC150V line, DC −150V line and GND line) pulled in the main body from a direct-current power supply. Load terminals of the main breaker 2 are connected with, through the earth leakage circuit breaker 3, three conductive bars 12 placed in the main body. A 150V branch circuit breaker(s) 4 is connected between a conductive bar 12 of DC150V or DC(−150V) and the conductive bar of GND. A 300V branch circuit breaker(s) 4 is connected between the conductive bar 12 of DC150V and the conductive bar 12 of DC(−150V). High-voltage direct-current power is supplied to the indoor high-voltage DC wiring 13 which is wired through the branch circuit breakers 4. The high-voltage DC wiring 13 is wired from the DC distribution board 1A to each room in housing, and DC outlets 80 are located in place. In a direct-current appliance such as an air-conditioning equipment 81, a refrigerator 82 or an electromagnetic cooker 83 connected to a DC outlet 80, a direct-current voltage from the DC outlet 80 is inverted into a high frequency alternating-current voltage through a built-in inverter circuit, thereby activating the load.

The direct-current power line 11 is connected with an AC/DC converter and a DC/DC converter 22. The converter 21 converts an alternating-current power from the alternating-current distribution board 30 into direct-current, and the converter 22 converts a voltage value of a direct-current voltage from a dispersed power supply 40 such as a photovoltaic facility 41. The direct-current power line 11 is also connected with a discharge and charge control device 23 for controlling discharge and charge of a power storage facility 42 with, for example, a lithium-ion battery or an electric double layer capacitor. The power storage facility 42 is used for: storing an electric power obtained by converting and charging alternating-current into direct-current at midnight during low electric power charge of a commercial alternating-current power supply, and then consuming the power at daytime during high electric power charge; or charging a surplus of an electric power generated by the photovoltaic facility 41, and then consuming the power as needed by load leveling or the like. In the figure, 24 and 25 are switches for disconnecting the dispersed power supply 40 and the power storage facility 42 from a direct-current power system, and 26 is a protector for system protection.

In the low-voltage DC wiring system type of DC distribution board 1B, internal devices such as circuit breakers 5 (branch circuit breakers) are put in the board. A direct-current power line 15 from a DC/DC converter 16 is pulled in the DC distribution board 1B, and circuit breakers 5 are connected to conductive bars 17 placed in the main body. The DC/DC converter 16 converts a high direct-current voltage from the DC distribution board 1A into SELV, and SELV is supplied to the conductive bars 17 in the DC distribution board 1B through the direct-current power line 15. An indoor low-voltage DC wiring 18 is wired via a circuit breaker 5, and is connected with an LED fixture 85 such as a downlight through, for example, a wall switch 84 to be activated by SELV. The low-voltage DC wiring 18 is connected with a direct-current appliance activated by SELV, such as a telephone, a personal computer, a flat-screen TV, an HDD recorder, a ventilating fan in a 24-hour ventilation system or a foot lamp. An internal device put in the DC distribution board 1B may be a device using SELV of, for example, an information device such as an information circuit breaker 7 or a switching HUB 8, or a DC outlet 9 for supplying SELV power supply. The information circuit breaker 7 is a device equipped with a function for preventing fraudulent access from an external network to an indoor LAN to which indoor equipment items are connected.

In the alternating-current distribution board 30, a main breaker 31 is connected with a single-phase three-wire commercial AC power supply type of power line 33 pulled in the main body 30a. Load terminals of the main breaker 31 are connected with conductive bars 34 corresponding to L1 phase, L2 phase and N phase, respectively. A 100V branch circuit breaker(s) 32 is connected between the conductive bar of N phase and the conductive bar of L1 phase or between the conductive bar of N phase and the conductive bar of L2 phase. A 200V branch circuit breaker(s) is connected between the conductive bar of L1 phase and the conductive bar of L2 phase. Indoor alternate-current branch wirings 35 include 100V wiring from which AC100V alternating-current power supply is supplied via a 100V branch circuit breaker 32, and 200V wiring from which AC200V alternating-current power supply is supplied via a 200V branch circuit breaker 32. The 100V wiring is connected with alternating-current appliances activated by 100V, such as a light fixture, a cleaner and a wash machine. The 200V wiring is connected with alternating-current appliances activated by 200V, such as an air-conditioning equipment, a refrigerator and an electromagnetic cooker 83.

A DC branch circuit protecting device in accordance with the present invention is comprised of a circuit breaker(s) 5 and a controller 6 as internal devices put in the low-voltage DC distribution board 1B.

Figure 2:
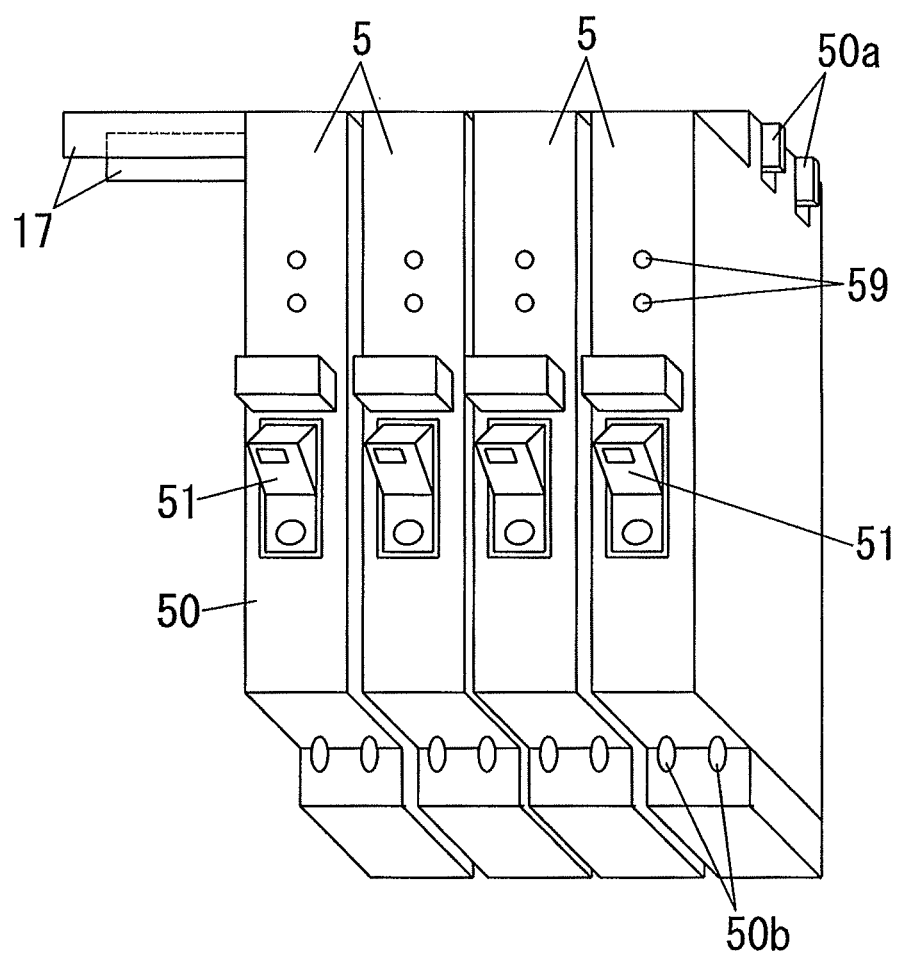
FIG. 2 is a perspective view of ditto appearance.

As shown in FIG. 2, an enclosure 50 of a circuit breaker 5 has the same dimensions as one-pole distribution board device. Plug-in grooves 50a are provided at one end side in a longitudinal direction of the enclosure 50 and connected with conductive bars 17 inserted therein. A power connecting terminal (not shown) formed of a blade spring retainer is located in each plug-in groove 50a. Wire insertion openings 50b into which wires from a load side are inserted are provided at the other end side in the longitudinal direction of the enclosure 50, and load connecting terminals (not shown) each having quick connection terminal construction are put therein so that they face the wire insertion openings 50b. Therefore, when the core of a wire of which jacket is removed is inserted into a wire insertion opening 50b, the wire is connected to the load connecting terminal located therein to be prevented extraction of the wire. A manual operation handle 51 for turning on and off an built-in on/off switch 52 to be described by manual operation and indicators 59 such as, e.g., LEDs for representing an operating condition by lighting condition are also placed at the front face of the enclosure 50. A conventional well-known terminal as disclosed in, for example, Patent Application Publication No. 2004-234921 is employed as each terminal having quick connection construction, which is not described in detail herein.

Figure 1:
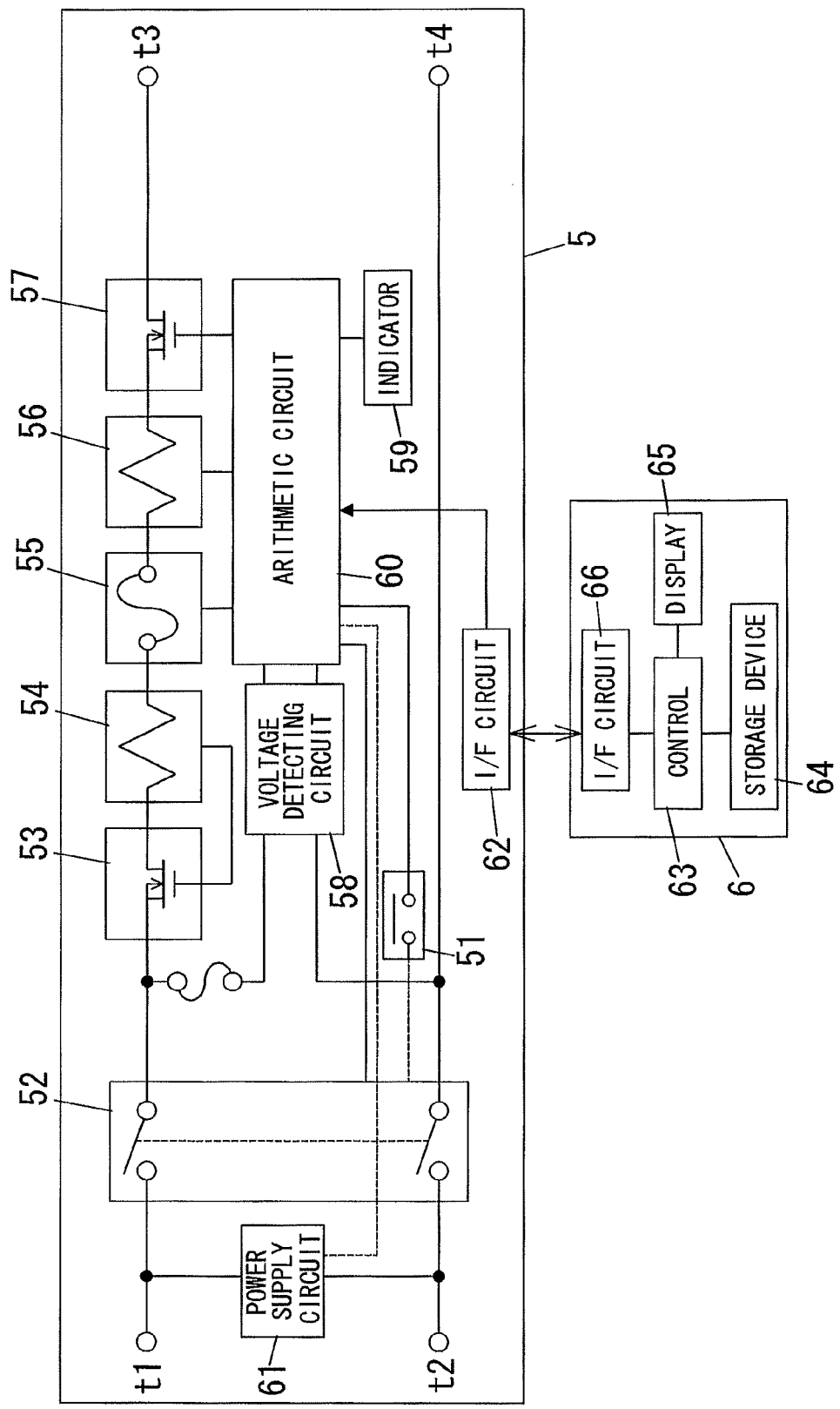
FIG. 1 is a block diagram of a DC branch circuit protecting device in an embodiment.

A circuit configuration of the circuit breaker 5 is now explained with reference to FIG. 1. The circuit breaker 5 includes power connecting terminals t1, t2 connected with the conductive bars 17 inserted therein and load connecting terminals t3, t4 connected with wires from a load. A double pole single throw type of on/off switch 52 is connected along an electrically-conducting path between the terminals t1-t3 and an electrically-conducting path between the terminals t2-t4. This on/off switch 52 is switched on or off in accordance with a switching operation through the manual operation handle 51. A semiconductor switch device 53 such as MOSFET, a current sensing resistor 54, a thermal fuse 55, a current sensing resistor 56 and a semiconductor switch device 57 such as MOSFET are connected in series between the load connecting terminal t3 at a positive side and the on/off switch 52. The circuit breaker 5 includes an I/F circuit 62 for inputting and outputting a signal with respect to the controller 6. When a switch control signal from the controller 6 is input to an arithmetic circuit 60 via the I/F circuit 62, the arithmetic circuit 60 as a switching controlling means turns the semiconductor switch device 57 on or off in accordance with control information of the switch control signal. The arithmetic circuit 60 also represents an operation condition by changing the lighting condition (lighting, extinction or blinking) of the indicators 59 such as LEDs. A power supply circuit 61 for generating operating power supply of the arithmetic circuit 60 obtains power supply from the upstream of the on/off switch 52, and can activate the arithmetic circuit 60 even when the on/off switch 52 is turned off.

The semiconductor switch device 53 is adapted to be turned off when voltage depression across the current sensing resistor 54 exceeds a predetermined reference value, thereby limiting an electric current flowing through the electrical circuit to a predetermined reference value (e.g., 15A).

When detecting an abnormal current flow such as an overload current or a short-circuit current based on voltage depression across the current sensing resistor 56 as a current sensing means, the arithmetic circuit 60 turns the semiconductor switch device 57 off in accordance with a predetermined breaking characteristic. The breaking characteristic of the arithmetic circuit 60 can be set to a characteristic of instantaneous detection, standard detection, longtime detection, Mag-Only or the like.

Figure 3A:
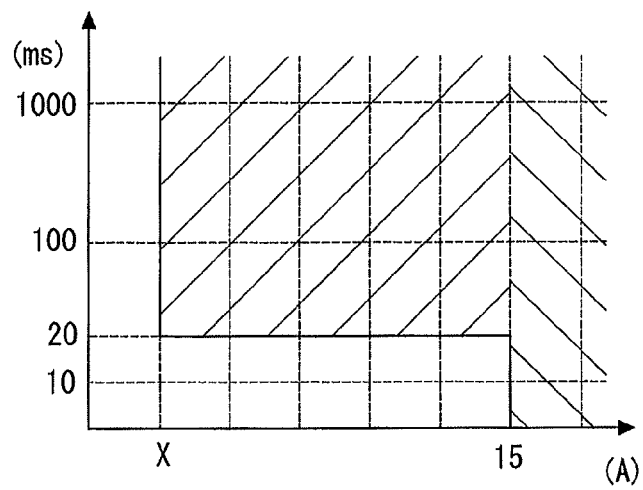
FIGS. 3A, 3B and 3C are explanatory diagrams showing abnormal-current breaking characteristics.
Figure 3B:
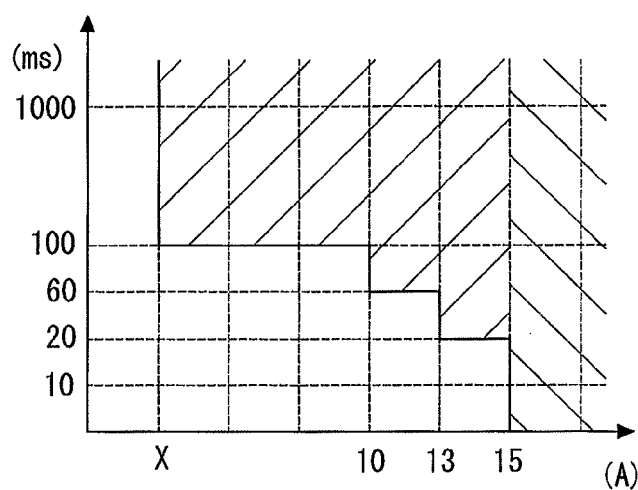
Figure 3C:
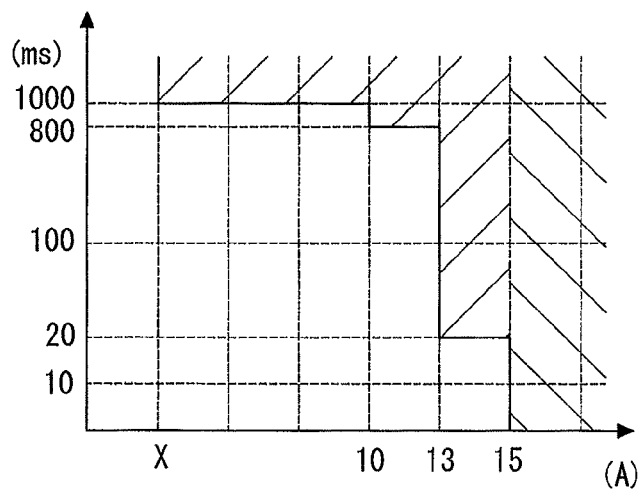

FIG. 3A shows an instantaneous detection type of breaking characteristic. When an electric current of x(A) or more flows continuously for 20 ms, the arithmetic circuit 60 turns the semiconductor switch device 57 off. FIG. 3B shows a standard detection type of breaking characteristic. In this case, the arithmetic circuit 60 turns the semiconductor switch device 57 off when an electric current of x(A) or more and less than 10 A flows continuously for 100 ms, or when an electric current of 10 A or more and less than 13 A flows continuously for 60 ms, or when an electric current of 13 A or more flows continuously for 20 ms. FIG. 3C shows a longtime detection type of breaking characteristic. In this case, the arithmetic circuit 60 turns the semiconductor switch device 57 off when an electric current of x(A) or more and less than 10 A flows continuously for 1000 ms, or when an electric current of 10 A or more and less than 13 A flows continuously for 800 ms, or when an electric current of 13 A or more flows continuously for 20 ms. In any of the breaking characteristics, when an electric current of 15 A or more flows, the electrical circuit is cut off by the semiconductor switch device 53. FIGS. 3A-3C show examples of the breaking characteristics, but in the arithmetic circuit 60, a current limit value (a setting current) and a breaking time with respect to the setting current may be set and changed appropriately based on load characteristics.

The arithmetic circuit 60 also includes a function for preventing an abnormal voltage from being supplied to a load circuit by turning the semiconductor switch device 57 off when a voltage detecting circuit 58 detects an abnormal input voltage (an excess voltage or an undervoltage).

The controller 6 has a function for controlling a switching condition of a plurality of circuit breakers 5, and includes a control circuit 63, a storage device 64 (a storing means), a display 65 and an I/F circuit 66. The storage device 64 comprises a nonvolatile memory, and stores sequences for turning the circuit breakers 5 on or off in turn. The display 65 is, for example, a liquid crystal display (LCD). The I/F circuit 66 is configured to input and output a signal with respect to the circuit breakers 5.

The controller 6 also includes different functions such as a branch output stopping function, a sequential turn-on function, a sequential turn-off function, an outage detecting function, a total voltage depression detecting function and a total current detecting function. During execution of the branch output stopping function, the control circuit 63 supplies an off control signal to a desired circuit breaker 5 via the I/F circuit 66, thereby turning the circuit breaker 5 off. During execution of the sequential turn-on function, the control circuit 63 as a control signal outputting means supplies an on control signal to the circuit breakers 5 in turn via the I/F circuit 66 in accordance with a sequence read from the storage device 64, thereby turning the circuit breakers 5 on in predetermined order. During execution of the sequential turn-off function, the control circuit 63 as the control signal outputting means supplies an off control signal to the circuit breakers 5 in turn via the I/F circuit 66 in accordance with a sequence read from the storage device 64, thereby turning the circuit breakers 5 off in predetermined order. During execution of the outage detecting function, the control circuit 63 detects the existence or nonexistence of outage based on a detection result of a voltage detecting means (not shown) for detecting a line voltage of a direct-current power line 15, and also announces outage occurrence through the display 65 when outage is detected. Power supply of the controller 6 is backed up by a secondary battery (not shown) so that it can continue the operation till the end of a protection time from outage occurrence. In the total current detecting function, the control circuit 63 calculates a sum of electric currents flowing through the circuit breakers 5 based on each current value from the circuit breakers 5 via the I/F circuit 66. When the sum of electric currents exceeds a preset value, the control circuit 63 supplies an off control signal to each circuit breaker 5 via the I/F circuit 66 to turn each circuit breaker 5 off.

As presented above, the DC branch circuit protecting device in the embodiment is, as an internal device, put in the DC distribution board 1B for distributing direct-current power supply to branch lines, and includes circuit breakers 5 each provided along branch lines branched from main wires of a direct-current power supply. The circuit breaker 5 includes power connecting terminals t1, t2 connected to the main wires in the DC distribution board 1B, and load connecting terminals t3, t4 connected to wires of a load side. The circuit breaker 5 also includes a semiconductor switch device 53 provided along an electrical circuit between the power connecting terminal t1 and the load connecting terminal t3, and a current sensing resistor 56 for detecting an electric current through the electrical circuit. The circuit breaker 5 also includes the arithmetic circuit 60 (a current setting means, a switch controlling means) which a set current according to a load connected to the load connecting terminals t3, t4 is set to, and which is configured to coercively turn the semiconductor switch device 53 off when a detection value of the current sensing means exceeds the set current. The circuit breaker 5 further includes the on/off switch 52 which is provided along the electrical circuit and opens or closes in accordance with an switching operation through a manual operation portion (the manual operation portion).

Thus, since the circuit breaker 5 is, as an internal device, put in the DC distribution board 1B, the necessary number of circuit breakers 5 are provided and thereby branch circuits can be easily increased or decreased. Moreover, in the circuits breaker 5, since a semiconductor switch device 53 is coercively turned off when the an electric current exceeding a set current according to a load flows, loads can be protected per branch circuit. In addition, since an on/off switch 52 is opened or closed in accordance with a switching operation through the manual operation portion, a maintenance work can be performed safely by handling the manual operation handle 51 to coercively turn the on/off switch 52 off when the maintenance work is performed at the branch circuit side or the like.

Moreover, in the circuit breaker 5, since the semiconductor switch device 57 is turned on or off in accordance with an on/off control signal from the controller 6, power feeding to the branch circuit can turned on/off through the controller 6. A load can be also protected by coercively turning the semiconductor switch device 57 off when an electric current exceeding the set current flows.

The controller 6 for controlling switching of the circuit breakers 5 sequentially turns the circuit breakers 5 on or off in accordance with a sequence stored in the storage device 64. Thus, branch circuits connected to the circuit breakers are sequentially turned on or off in accordance with a sequence stored in the storing means, and thereby allowing power supply to loads connected to the branch circuits to start in predetermined order or allowing the power supply to stop.

Each circuit breaker 5 also includes: plug-in terminals such as blade spring retainers which conductive bars 17 as power connecting terminals are inserted into and connected to; and terminals each having quick connection construction as load connecting terminals to be connected with inserted cores of wires of which jackets are removed.

Thereby, it is easy to perform a work for connecting the power connecting terminals of a circuit breaker 5 to conductive bars 17. Since a work for screw tightening is unnecessary, it is easy to perform a work for connecting load connecting terminals and wires from a load, and to perform an electrically connecting work of a circuit breaker 5.

In each circuit breaker 5, an arithmetic circuit 60 as a supervisory signal outputting means calculates a current value from a voltage depression across the current sensing resistor 56 to supply the current value as a supervisory signal to the controller 6 through the I/F circuit 62.

Thereby, the controller can obtain each current value though the branch circuits.

In each circuit breaker 5, an on/off switch 52 is turned on or off in accordance with a switching operation through the manual operation handle 51. It is therefore possible to perform a maintenance work safely by handling the manual operation handle 51 to coercively turn the on/off switch 52 off when the maintenance work is performed at the branch circuit side or the like.

In the embodiment, the circuit breaker 5 supplies the branch circuit with a direct-current voltage obtained through the conductive bars 17 without change, but the circuit breaker 5 may include a built-in DC/DC converter (not shown) and be configured to supply a direct-current voltage of which voltage value is changed through the DC/DC converter.

INDUSTRIAL APPLICABILITY

As presented above, according to the DC branch circuit protecting device of the present invention, a circuit breaker is, as an internal device, put in a distribution board, and it is accordingly possible to easily increase or decrease the number of branch circuits by installing the necessary number of circuit breakers. Moreover, loads can be protected per branch circuit because each semiconductor switch device is coercively turned off when an electric current exceeding a set current according to a load flows. In addition, an on/off switch is opened or closed in accordance with a switching operation through the manual operation portion, and accordingly a maintenance work can be performed safely by handling the manual operation portion to coercively turn the on/off switch off when the maintenance work is performed at the branch circuit side.

REFERENCE SIGNS LIST

1B DC distribution board
5 circuit breaker
6 controller 15 direct-current power line (main wires)
16 DC/DC converter (direct-current power supply)
17 conductive bar (main wire)
56 current sensing resistor (current sensing means)
57 semiconductor switch device
60 arithmetic circuit (switch controlling means)
t1, t2 power connecting terminal
t3, t4 load connecting terminal

The invention claimed is:

1. A DC branch circuit protecting device, comprising:
a distribution board that distributes a direct-current power supply to branch lines branched from main wires of the direct-current power supply; and
a circuit breaker that is an internal device of the distribution board and that is provided along each of the branch lines,
wherein the circuit breaker comprises:
power connecting terminals connected to the main wires in the distribution board;
load connecting terminals connected with wires from a load;
a semiconductor switch device provided along an electrical circuit between the power connecting terminals and the load connecting terminals;
a current sensing means for detecting an electric current through the electrical circuit;
a current setting means which a set current according to a load connected to the load connecting terminals is set to;
a switch controlling means for coercively turning the semiconductor switch device off when a detection value of the current sensing means exceeds the set current set to the current setting means; and
an on/off switch that is provided along the electrical circuit and is turned on or off in accordance with a switching operation through a manual operation portion, wherein
the power connecting terminals comprise plug-in terminals which conductive bars forming the main wires in the distribution board are inserted into and connected with, and
the load connecting terminals comprise terminals each having quick connection construction, which cores of the wires of which jackets are removed are inserted into and connected with.

2. The DC branch circuit protecting device of claim 1,
wherein a controller for controlling a switching of the circuit breaker is, as an internal device, put in the distribution board along with the circuit breaker, and
wherein the switch controlling means is configured to turn the semiconductor switch device on or off in accordance with an on/off control signal from the controller.

3. The DC branch circuit protecting device of claim 2,
wherein the circuit breaker comprises a plurality of circuit breakers, and
wherein the controller is provided with: a storing means for storing a sequence for turning the circuit breakers on or off in turn; and a control signal outputting means configured to supply each of the circuit breakers with an on/off control signal so that the circuit breakers are turned on or off in turn in accordance with the sequence stored in the storing means.

4. The DC branch circuit protecting device of claim 2,
wherein said circuit breaker is provided with a supervisory signal outputting means configured to supply the controller with a detection value of the current sensing means as a supervisory signal.

5. The DC branch circuit protecting device of claim 3,
wherein said circuit breaker is provided with a supervisory signal outputting means configured to supply the controller with a detection value of the current sensing means as a supervisory signal.

* * * * *